May 1, 1962 D. DAPONTE ETAL 3,032,458
CELLULAR STRUCTURES MADE FROM SHEET MATERIALS
Filed March 8, 1956 3 Sheets-Sheet 2
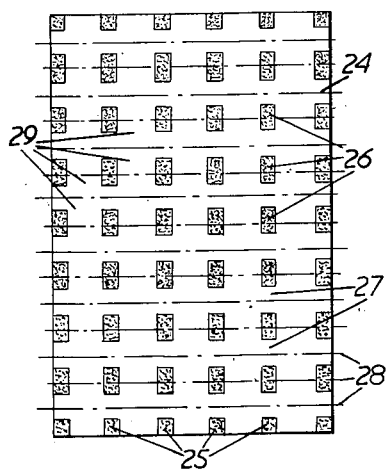
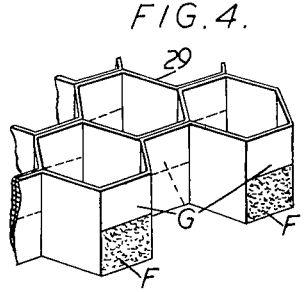
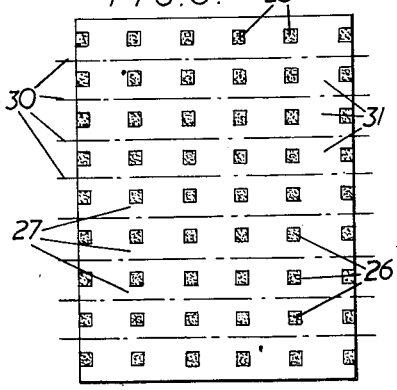
Inventors
DEMETRE DAPONTE
AND GEORGE MAY
By Linton and Linton
Attorneys May 1, 1962   D. DAPONTE ETAL   3,032,458
CELLULAR STRUCTURES MADE FROM SHEET MATERIALS
Filed March 8, 1956   3 Sheets-Sheet 3

Inventor
DEMETRE DAPONTE
AND GEORGE MAY
By Linton and Linton
Attorneys

United States Patent Office 3,032,458
Patented May 1, 1962

3,032,458
CELLULAR STRUCTURES MADE FROM
SHEET MATERIALS
Demetre Daponte, Withdean, and George May, Wembley, England, assignors to Dufaylite Developments Limited, London, England
Filed Mar. 8, 1956, Ser. No. 570,310
9 Claims. (Cl. 154—45.9)

This invention comprises improvements in or relating to cellular structures made from paper or like flexible sheet material, and relates especially, but not exclusively, to cellular filling for double skin structural elements wherein the fillings are faced on opposite sides by boards or skins of sheet material, generally thicker and less flexible than that of the fillings, to form a sandwich of high strength weight ratio, such structural elements being commonly used in aircraft construction, and in the manufacture of furniture, buildings and the like.

A known method of making a cellular structural element comprises the steps of applying adhesive to a sheet or web of paper or other flexible sheet material continuously or intermittently along a plurality of spaced parallel bands, either on one side only or in mutually staggered relationship on opposite sides of each sheet, piling up a number of such sheets on a platen to form a stack, the adhesive bands on each superimposed sheet, when on one side only being parallel to and staggered with respect to those on the underlying sheet, or when on both sides having the bands on the underside in register with those on the upper side of the underlying sheet, and opening out the parts of the sheets between said bands by expanding the stack in the direction normal to the planes of the sheets to produce a lattice.

It is an object of the present invention to provide a novel method of distributing the adhesive which results in the formation of a product of improved pliability.

Various aspects of the invention are illustrated by way of example in the accompanying diagrammatic drawing in which:

FIGURES 3 to 6 show various aspects of the production of cellular structures having the features of the invention.

Figure 1:
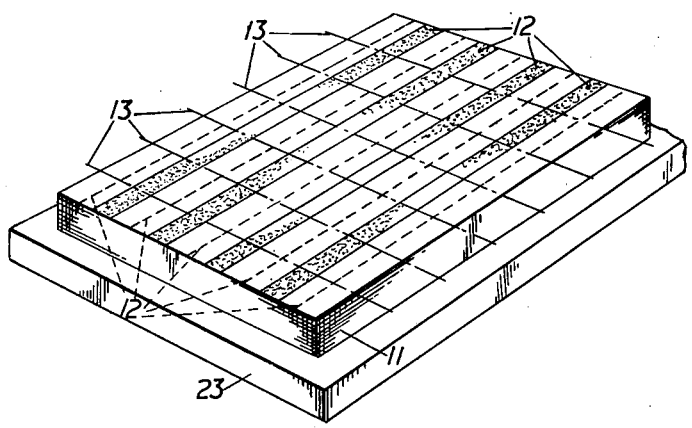
FIGURES 1 and 2 illustrate briefly a known method of making cellular fillings.
Figure 2:
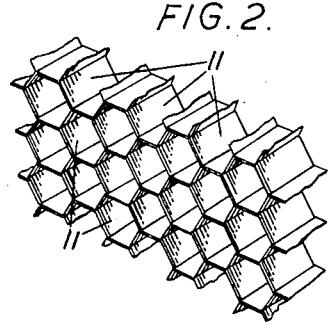
Figure 6:
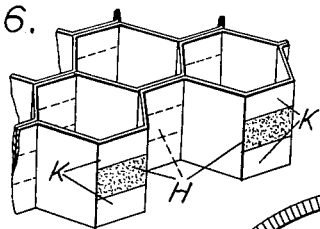

FIGURE 1 shows a piled up stack of sheets 11 to the upper surface to each of which parallel glue bands 12 have been applied, the glue bands on each sheet being staggered with respect to those on the sheet immediately preceding and the sheet next succeeding by a distance equal to half the distance or pitch between the consecutive bands on each sheet. This stacking is carried out on a reciprocating platen 23 and the glue bands are applied to each sheet in turn through the screen of the silk screen type printing frame, the platen being moved sideways by an amount equal to half the pitch of the bands on the sheets between glueing of one sheet and the next, first in one direction and then in the other, to obtain the desired staggering of the glue bands. The stack is completed by placing on it a top sheet that has no glue bands applied on its upper surface, and it may then be cut into sections along lines 13 normal to the glue bands and each section expanded into the open cellular form shown in FIGURE 2. If the stack has been built up from paper impregnated with resin in the uncured state, the resin can now be cured by passing the expanded material through an oven so that it is set in the expanded condition.

Turning now to FIGURES 3 to 6, these show how expanded cellular sections can be produced so as to bend readily to conform to curved surfaces.

In FIGURES 3 to 6, the adhesive applied to the sheets making up the stack or pile 24, seen in plan, from which the cellular structures are formed, is not in continuous bands but in broken bands 25, wherein along the length of the bands a succession of areas 26 of adhesive are separated by spaces 27 where no adhesive is applied. As previously described, the usual way of applying the adhesive bands to the sheets is by the use of a stencil in a silk screen type of printing process, and this may be readily adapted to apply the adhesive in broken instead of continuous bands.

In one example (FIGURE 3), the adhesive is applied to each sheet in the stack 24, from which the cellular structures are to be formed, in parallel broken bands 25, each band comprising a succession of short areas 26 of adhesive each about one inch long, separated by blank spaces 27 equal in length to the adhesive areas. By cutting the stack so produced along lines 28 about one inch apart at right-angles to the adhesive bands 25, with the lines 28 bisecting the adhesive areas 26 and also the blank spaces 27 between them, a number of sections 29 approximately one inch wide are obtained, each of which can be pulled out in the direction normal to the strips or sheets of which it is composed to form an openwork cellular structure (FIGURE 4). At each of the places in this structure where two consecutive strips of the sheet material are stuck to one another, it will be found that the strips are stuck for only half their width F extending from one edge, the other half G being unstuck, and all these unstuck places are on the same side of the structure.

Figure 7:
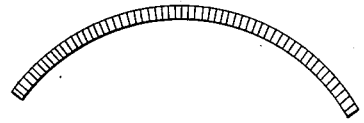

If the sheet material used for building up the stack was resin impregnated paper, the structure may now be cured in the expanded condition to set it in this form; normally, after curing of the structure in this way, it would thereatfer not be an easy matter to bend it into a curved form. However, in the case of the structure produced by the novel method described, bending takes place very readily in a plane substantially at right-angles to the planes of the sheets in the stack from which the structure has been formed, that is, as it were with the curve across the "grain" of the structure, and with the unstuck places between the consecutive sheets or strips on the outside of the curve; a curve such as illustrated in FIGURE 7 can therefore be readily formed. Bending can also be effected, but less readily, in the plane parallel to the sheets, that is, in the direction of the "grain," again with the unstuck places on the outside of the curve.

It is found that when each section of the stack is expanded into the openwork form and cured, the resulting structure may be flat, or may have curvature in the planes above referred to, according to the degree of expansion of the section. Accordingly, it is possible to produce a curved part, in some cases, by regulating the degree of expansion of the cellular structure so that little or no subsequent bending after curing is necessary.

Figure 8:
FIGURES 7 to 13 illustrate some of the uses to which the cellular structures may be put.

As a second example (FIGURE 5), the bands 25 of adhesive applied to the sheets in the stack may each comprise a succession of adhesive areas 26 separated by blank spaces 27 of twice the length of the adhesive areas. To produce cellular structures of one inch in width, the adhesive areas 26 would each be one third of an inch long and the blank spaces 27 two thirds of an inch long. On cutting the finished stack along lines 30 at right-angles to the adhesive bands spaced one inch apart and bisecting the blank spaces 27, a plurality of sections 31 are obtained, each of which may be expanded and cured to give a cellular structure (FIGURE 6), in which, at each place where two consecutive strips of the sheet material are stuck together, the centre third H of the width of the strips is stuck, the remaining marginal portions K extending up to the cut edges on each side of said centre third remaining unstuck. This structure only expands naturally into the flat condition, but after expansion and curing, it may be readily curved in a plane substantially normal to the plane of the sheets in either direction, that is to say, with either of the cut sides of the structure on the outside of the curve. This makes it a simple matter to obtain a double-curvature such as is illustrated in FIGURE 8.

It will be appreciated that although specific proportions of the width of the strips, that is half and a third, are mentioned in the foregoing examples as being stuck, these proportions can be varied as desired without departing from the scope of the invention. Moreover, in the case where an intermediate portion of the strips is stuck leaving the margins unstuck, this intermediate portion need not be centrally disposed as in the example, but may be offset towards one side or the other, such as for a case where a structure is required to bend at one place in one direction and at another place in the opposite direction, and the degree of curvature required in the two cases is different. It is also not essential, to be within the scope of the invention, that each place is a structural element where the strips are stuck to one another, should be treated in a like manner; that is to say, in some parts of the structure the unstuck parts of the joints could, for example, extend up to one edge, and in other parts up to the opposite edge, and this will also be found useful in cases where a part is to have complex curves in which the radius of curvature changes from positive to negative, so that in some places one side of the structure is on the outside of the curve and in other places the opposite side is on the outside.

Figure 9:
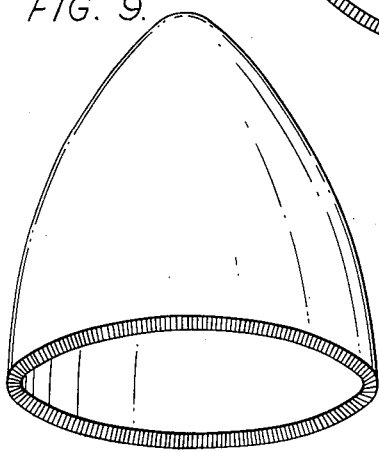
Figure 10:
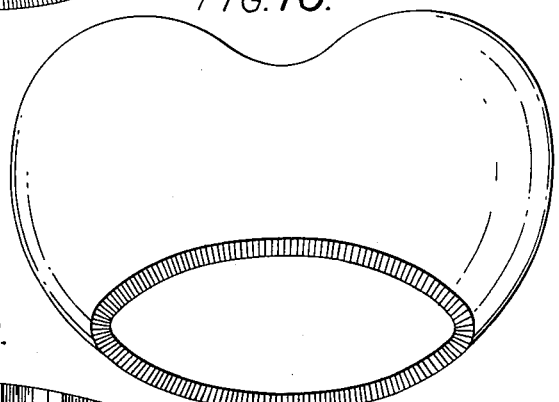

In addition to the making of lineally-curved elements with both simple and complex curves, the pliable cellular material made according to this aspect of the invention may be employed in the manufacture of parts having surfaces curved in more than one direction. FIGURES 9 and 10 illustrate two of the different complex shapes that can be produced.

Figure 11:
Figure 12:
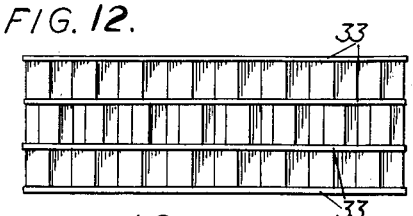
Figure 13:

Any of the cellular structures described in the foregoing may if desired be used as fillings in double skin sandwich type structural elements of planar configuration, as illustrated in FIGURE 11. The skins 33 may be of a single ply material, as frequently used in building construction, or two ply such as in cases where the element is to be finished with a veneer, or may be material with three or more plies as favoured in the aircraft industry. Furthermore, a sandwich structure of two or more layers may be built up, that is to say a structure wherein the outer sections have between them two or more thicknesses of cellular filling separated by one or more intermediate sections, as illustrated in FIGURE 12. Structural elements having profile sections, for example, aerofoil sections, as illustrated in FIGURE 13, may also be readily produced.

It will be understood that materials other than those specifically mentioned above may, in certain cases be used in the manufacture of these structural elements and cellular fillings, without departure from the scope of the invention. Examples of the materials that can be used for cellular fillings of this kind include paper made from natural fibres such as wood, etc., and also webs of asbestos, synthetic materials and glass fibres. The skins for the structural elements may be of any known form of sheet material as may be desired, including paper, pulp board, ply board, synthetic sheet material, composite board, metal, wall board, plaster board, and also suitably treated woven fabric, resinated asbestos and resin treated glass fibre cloth.

What we claim is:

1. A method of making an expandible structural honeycomb material which comprises securing together a number of layers of flexible sheet material in a stack by means of an adhesive distributed between the layers in patches arranged in arrays of intersecting rows and columns and positioned such that the columns at the one face of each intermediate layer are staggered with respect to the columns at the other face of said layer while the rows at said faces are coincident, and slicing the stack by cutting it in the direction of the rows at positions such that the contacting pairs of faces of the sheet material within the slices thus produced are secured together over a part only of their width by a single row of patches.

2. A method according to claim 1, in which the stack is cut only between the rows.

3. A method according to claim 2, in which the stack is cut between the rows and through the rows.

4. A structural honeycomb material of the expanded type comprising a pack of strips of flexible sheet material having an expanded cellular form with each cell being of a hexagonal configuration, said pack having a pair of boundary faces constituted by the longitudinal edges of the strips and each strip being of such width as to extend from the one boundary face of said pair to the other boundary face of said pair, an adhesive arranged upon said strips in patches whose dimensions taken in the direction of separation of said boundary faces are less than the distance between said boundary faces and which are distributed such that each intermediate strip of the stack is held in face-to-face contact with the strip preceding it only by a first single row of said patches and is held to the strip succeeding it only by a second single row of said patches, said rows of patches having the patches thereof equally spaced apart along all of said strips and said patches in said first single row being staggered in the direction of the length of said strip relative to said patches in said second single row.

5. A structural honeycomb material according to claim 4 of which the faces defined in the expanded material by the edges of the strips have a curved configuration.

6. A structural honeycomb material according to claim 4 in which all the patches are nearer to those edges of the strips which define one face of the material than the other boundary face thereof.

7. A structural honeycomb material according to claim 4 in which one of said faces has a domed configuration.

8. A structural honeycomb material according to claim 4, in which the patches are spaced apart from the edges of the strips.

9. A structural honeycomb material according to claim 4 of which one of the faces defined by the edges of the strips in the expanded material is curved over one region thereof about a first axis and is curved over another region about a second axis, said first and second axes being substantially parallel to one another and being located to opposite sides of said material.

References Cited in the file of this patent

UNITED STATES PATENTS

| | | |
|---|---|---|
| 2,056,563 | Budd et al. | Oct. 6, 1936 |
| 2,408,245 | Walter | Sept. 24, 1946 |

(Other references on following page)

UNITED STATES PATENTS

| | | | |
|---|---|---|---|
| 2,428,979 | May | Oct. 14, | 1947 |
| 2,553,054 | Lincoln et al. | May 15, | 1951 |
| 2,581,421 | Lombard et al. | Jan. 8, | 1952 |
| 2,587,171 | Knewstubb et al. | Feb. 26, | 1952 |
| 2,636,540 | Lincoln | Apr. 28, | 1953 |
| 2,644,777 | Havens | July 7, | 1953 |
| 2,651,588 | Bruce et al. | Sept. 8, | 1953 |
| 2,654,686 | Hansen | Oct. 6, | 1953 |
| 2,670,026 | Ungar | Feb. 23, | 1954 |
| 2,674,295 | Steele et al. | Apr. 6, | 1954 |
| 2,734,843 | Steele | Feb. 14, | 1956 |
| 2,819,196 | Munro | Jan. 7, | 1958 |
| 2,848,132 | Davous | Aug. 19, | 1958 |

FOREIGN PATENTS

| | | | |
|---|---|---|---|
| 529,730 | Great Britain | Nov. 27, | 1940 |
| 625,036 | Great Britain | June 21, | 1949 |
| 654,645 | Great Britain | June 27, | 1951 |
| 723,621 | Great Britain | Feb. 9, | 1955 |

OTHER REFERENCES

Thermoplastic Honeycombs, May; Plastics (London), November 1951, pages 305, 306 and 307.